(12) United States Patent  
Cross et al.

(10) Patent No.: US 9,037,655 B2  
(45) Date of Patent: May 19, 2015

(54) MAINTAINING INSTANT MESSAGING CONVERSATIONS WHEN A RECIPIENT IS NOT AT THEIR PRIMARY WORKSTATION

(75) Inventors: Alastair G. R. Cross, Mulhuddart (IE); Simon P. O'Doherty, Mulhuddart (IE); Cormac O'Leary, Mulhuddart (IE)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/778,728

(22) Filed: May 12, 2010

(65) Prior Publication Data

US 2010/0293239 A1 Nov. 18, 2010

(30) Foreign Application Priority Data

May 18, 2009 (EP) ..................................... 09160531

(51) Int. Cl.
*G06F 15/16* (2006.01)
*H04L 12/58* (2006.01)

(52) U.S. Cl.
CPC .............. *H04L 12/581* (2013.01); *H04L 51/04* (2013.01); *H04L 12/5815* (2013.01); *H04L 51/043* (2013.01)

(58) Field of Classification Search
CPC ....... H04L 51/04; H04L 51/043; H04L 51/14; H04L 51/32; H04L 51/36; H04L 69/24; G06Q 10/107; G06F 11/3055; H04M 3/46; H04M 3/50; H04M 3/42365; H04W 4/12; H04W 4/18
USPC .......................................................... 709/206
See application file for complete search history.

(56) References Cited

U.S. PATENT DOCUMENTS 6,430,604 B1    8/2002   Ogle et al.
7,035,865 B2 *   4/2006   Doss et al. ............................. 1/1
(Continued)

FOREIGN PATENT DOCUMENTS

EP     1372316 A1    12/2003

OTHER PUBLICATIONS

Book 'SIP for Dummies' (copyright 2006) to Gregory et al. ("Gregory").*

(Continued)

*Primary Examiner* — June Sison
(74) *Attorney, Agent, or Firm* — Patents on Demand P.A.; Brian K. Buchheit; Scott M. Garrett

(57) ABSTRACT

An instant messaging client apparatus and method for use with a data processing system associated with a data processing network. The apparatus comprising: an input/output component for receiving from the data processing network a first instant message; a presence component for determining whether a user is locatable at the modified instant messaging client in order for the user to transmit a response to the received first instant message; a first location component for analyzing an information source associated with the user for determining a list of locations where the user is locatable for communication; a second location component for polling the list of locations to determine whether the user is present at a location identified on the list; and a communicator component for initiating a communication for sending the received first instant message to a remote device associated with the user at the identified location.

24 Claims, 7 Drawing Sheets

(56) References Cited

U.S. PATENT DOCUMENTS

| | | | |
|---|---|---|---|
| 7,227,937 | B1 | 6/2007 | Yoakum et al. |
| 7,269,627 | B2* | 9/2007 | Knauerhase ............... 709/206 |
| 7,295,657 | B1 | 11/2007 | Keohane et al. |
| 7,363,345 | B2 | 4/2008 | Austin-Lane et al. |
| 7,373,428 | B1* | 5/2008 | Armstrong et al. .......... 709/249 |
| 8,027,452 | B2* | 9/2011 | O'Sullivan et al. ...... 379/218.02 |
| 8,701,014 | B1* | 4/2014 | Schlegel et al. ............. 715/741 |
| 2002/0024947 | A1* | 2/2002 | Luzzatti et al. ............. 370/352 |
| 2002/0087704 | A1* | 7/2002 | Chesnais et al. ............ 709/228 |
| 2004/0059781 | A1 | 3/2004 | Yoakum et al. |
| 2004/0078445 | A1 | 4/2004 | Malik |
| 2004/0158609 | A1* | 8/2004 | Daniell et al. ............... 709/206 |
| 2005/0004984 | A1* | 1/2005 | Simpson ...................... 709/205 |
| 2006/0031339 | A1* | 2/2006 | Peters .......................... 709/206 |
| 2006/0242246 | A1* | 10/2006 | Lyle et al. ................... 709/206 |
| 2007/0130277 | A1* | 6/2007 | Roskind et al. ............. 709/207 |
| 2007/0260730 | A1* | 11/2007 | Gadwale ...................... 709/224 |
| 2008/0140436 | A1* | 6/2008 | Burkhardt et al. ............... 705/1 |
| 2008/0291022 | A1* | 11/2008 | Amador et al. ............. 340/572.1 |
| 2010/0248758 | A1* | 9/2010 | Kim et al. .................... 455/466 |
| 2010/0267374 | A1* | 10/2010 | Armstrong et al. .......... 455/417 |

OTHER PUBLICATIONS

RFC 5344 Presence and Instant Messaging Peering Use Cases (Oct. 2008) to Houri et al. ("Houri").*

U.S. Appl. No. 61/212,829.*

ETSI TS 12919814v8.0.0 (Jan. 2009) 'Technical Specification; UTMS; LTE; OSA; API; Part 14 Presence and Availability Management (PAM) Service Capability Feature (SCF)' (3GPP TS 12919814v8.0.0 Release 8) to GPSS. ("GPSS").*

\* cited by examiner

MAINTAINING INSTANT MESSAGING CONVERSATIONS WHEN A RECIPIENT IS NOT AT THEIR PRIMARY WORKSTATION

CROSS-REFERENCE TO RELATED APPLICATIONS

This application claims the benefit of European Patent Application No. 09160531.1 filed 18 May 2009, entitled "AN APPARATUS, METHOD AND COMPUTER PROGRAM FOR MAINTAINING INSTANT MESSAGING", which is assigned to the assignee of the present application, and the teachings of which are hereby incorporated by reference in their entirety.

BACKGROUND

The disclosure relates to the field of Instant Messaging and, more particularly, to maintaining instant messaging conversations when the recipient does not have direct access to the resources of the recipient's primary workstation.

Instant messaging (IM) is a communication system that provides informal real-time communication between users of data network facilities. Typically, two or more users exchange text messages through a channel or a virtual chat room maintained on one or more IM Servers. IM may also be used for data transfer between users. Examples of IM systems include IBM® Lotus® Sametime® (IBM, Lotus and Sametime are trademarks of International Business Machines Corporation in the United States, other countries, or both), Yahoo®, Messenger, and AOL® Instant Messenger™.

Typically, IM communications follow a Client/Server model across a network. In a Client/Server model, a client computer program provides a service request to a server computer program, which fulfils the request. Both client and server programs are often part of a larger program or application. Multiple client programs may share the services of a common server program. Therefore, chat sessions may comprise more than two participants.

In contrast to the Client/Server model, a Peer-to-Peer (P2P) is a communications model in which each party has similar capabilities and either party may initiate a communications session. A first computer program communicates with a second computer program through either a wired or a wireless link. Although typical IM communications follow a Client/Server model, many IM systems also have the capability to follow a P2P model. For example, IRC allows P2P communications between two participants to exchange chat or data transfers using the Direct Client-to-Client (DDC) protocol.

An IM system may use a wired or a wireless network. Bluetooth technology is an example of wireless technology. Bluetooth is a short-range radio frequency (RF) technology with a 2.4 GHz frequency. Typical ranges are 1 m, 10 m and 100 m dependent on the available power of the Bluetooth system.

For the avoidance of doubt, the terms IM Client and IM Server, as used herein, are to be construed as the IM Client and IM Server computer programs respectively, of an IM system. An IM system, typically, comprises an IM server and a plurality of IM Clients. An IM Client is operable for use with a primary workstation.

One issue with instant messaging is that user availability may be lost if the user moves away from using their primary workstation. If the user physically moves away from their primary workstation, IM availability is lost, but may be re-established using an IM Client on another workstation at a new physical location. However, in the mean time important messages may be lost. There are a number of solutions to address the issue of maintaining IM availability. For the avoidance of doubt, as used herein, a user is 'available' if the user may interact with an IM Client. Direct availability means that the user may interact with an IM Client running on a workstation. Indirect availability means that the user may interact with an IM Client through, for example, a short-range remote device locatable within range of an IM Client.

One solution is provided by the use of an IM Client on a remote device. Remote devices such as mobile phones or personal digital assistants (PDAs) are just as pervasive in day to day work as standard desktop or mobile workstations. However, such devices only have a limited range to a network through short range wireless technologies such as Bluetooth or Radio Frequency Identification (RFID). Users may switch between an IM Client on a workstation to one on a remote device; however such switching is not seamless and requires re-logging into the IM system. If the user is participating in a multiple-user chat, re-logging may mean having to be re-invited to the active chat. Message exchanges made between the participants during the interruption will be lost by the user.

Another approach in using a remote device is to switch IM Client usage from a workstation to the remote device prior to changing location. However, in order to ensure that IM usage on the remote device maintains an equivalent functionality as IM usage on the workstation, either server side logging or synchronization of IM information on the remote device with the IM information on the workstation is required. These methods have disadvantages. Storing logs on a server may take up valuable server storage resources. In addition, storing private chat logs on the remote device may become a security risk if the user's personal device is stolen or resold.

One problem to address is for an IM system to establish whether the intended recipient of a message is available at an expected workstation. This is typically addressed through the use of a Presence System, that monitors computer usage (for example, through keyboard or mouse interaction), or by the user marking that they are not available. The availability status is reported back to the IM Server, which may in turn report the status to the other users of the system. Another problem to address is for the system to locate where messages intended for a recipient that is not at their primary workstation should be transmitted to.

BRIEF SUMMARY

Numerous aspects of the disclosure are contemplated which can be optionally implemented in various embodiments of the disclosure. Not all aspects are present in every embodiment, and described aspects are expected to be tailored and adapted for specific implementations. Thus, the various aspects and details expressed herein, when taken as a whole, permit one of ordinary skill in the art to grasp the scope of the present disclosure, which is defined more succinctly by the claims. It should be understood that nothing in this brief summary or detailed description is meant to be construed in a manner that limits the scope of the claimed content expressed herein.

Viewed from a first aspect, the disclosure provides an instant messaging client apparatus operable for use with a data processing system associated with a data processing network, the apparatus comprising: an input/output component for receiving from the data processing network a first instant message; a presence component for determining whether a user is locatable at the instant messaging client in order for the user to transmit a response to the received first instant message; a first location component for analyzing an information source associated with the user for determining a list of locations where the user is locatable for communication, in response to determining that the user is not locatable at the instant messaging client; a second location component for polling the list of locations to determine whether the user is present at a location identified on the list; and a communicator component for initiating a communication method for sending the received first instant message to a remote device associated with the user at the identified location, in response to the user being identified at a location on the list.

Advantageously, the disclosure provides means for instant messaging users to no longer miss out on conversations simply because they are required to physically move locations. To the other participants of the meeting, the person switching devices would appear to be online as normal.

The disclosure provides an apparatus wherein the presence component further comprises wireless monitoring means operable for monitoring a remote device connectable to the instant messaging client.

The disclosure provides an apparatus wherein the communicator component is further operable for initiating a wireless communication method for sending the received first instant message to the remote device, in response to the user being identified at the remote device. Advantageously, the invention allows an instant message to be communicated from the instant messaging client to a remote device within wireless communication of the client channel.

The disclosure provides an apparatus wherein the communicator component further comprises a wireless communication means operable for sending a second instant message to the remote device associated with the user at the instant messaging client, in response to the apparatus determining not to send the first instant message to the remote device, wherein the second instant message indicates that the first instant message has been received.

Advantageously, the disclosure allows an instant messaging client to determine not to pass on a re-sent instant message, but instead to send a new instant message to the user at the remote device to inform the user that another user is attempting to contact them. This communication system uses an on-off transmit to the remote device, so the remote device is not trusted or paired with the computer except at the point of a message being sent or received.

The disclosure provides an apparatus wherein the apparatus is operable for communicating with an instant messaging server through the data processing network. Alternatively, the disclosure provides an apparatus wherein the apparatus is operable for communicating with a further instant messaging client through a peer to peer connection.

Advantageously, the invention allows an instant message to be communicated to the instant messaging client from an IM server or from a peer to peer communication channel.

The disclosure provides an apparatus wherein the first instant message comprises a chat message. Advantageously, the invention is operable for chat instant messaging, that communications between users are not interrupted when a user changes location.

The disclosure provides an apparatus wherein the communicator component is further operable for initiating a communication method for sending a presence response to a messaging client, in dependence on the first instant message comprises a presence request.

Advantageously, the disclosure allows an instant messaging client to respond to queries from other messaging clients about the presence of a user.

The disclosure provides an apparatus wherein: the first instant message comprises a presence response; the presence component is further operable for analyzing the presence response; and the communicator component is further operable, in response to determining that the user is not locatable at a first identified location, for initiating a communication method for sending a presence request to a second identified location. Advantageously, the disclosure allows for multiple locations to be polled for the presence of a user.

The disclosure provides an apparatus wherein the communicator component is further operable for storing the first instant message, in response to the user not being identified at a location on the list.

The disclosure provides an apparatus wherein the communicator component is further operable for initiating a communication method for sending the stored first instant message to a remote device associated with the user at an identified location, in response to the user being identified at a location on the list. Advantageously, the disclosure allows an instant messaging client cache an instant message if the user cannot be located. In addition, the disclosure allows an instant messaging to send a cached instant message if the user later becomes locatable.

The disclosure provides an apparatus wherein the information source comprises social networking information or hierarchical information.

Viewed from a second aspect, the invention provides a method for processing an instant message operable for use with a data processing system associated with a data processing network, the method comprising the steps of: receiving from the data processing network a first instant message; determining whether a user is locatable at the instant messaging client in order for the user to transmit a response to the received first instant message; analyzing an information source associated with the user for determining a list of locations where the user is locatable for communication, in response to determining that the user is not locatable at the instant messaging client; polling the list of locations to determine whether the user is present at a location identified on the list; and initiating a communication method for sending the received first instant message to a remote device associated with the user at the identified location, in response to the user being identified at a location on the list.

The disclosure provides a method, wherein the method further comprises the step of monitoring a remote device connectable to the instant messaging client.

The disclosure provides a method, wherein the method further comprises the step of sending the received first instant message to the remote device, in response to the user being identified at the remote device.

The disclosure provides a method, wherein the method further comprises initiating a wireless communication method operable for sending a second instant message to the remote device associated with the user at the instant messaging client, in response to the apparatus determining not to send the first instant message to the remote device, wherein the second instant message indicates that the first instant message has been received.

The disclosure provides a method, wherein the method further comprises the step of communicating with an instant messaging server through the data processing network.

The disclosure provides a method, wherein the method further comprises the step of communicating with a further instant messaging client through a peer to peer connection.

The disclosure provides a method, wherein the first instant message comprises a chat message.

The disclosure provides a method, wherein the method further comprises the steps of initiating a communication method for sending a presence response to a messaging client, in dependence that the first instant message comprises a presence request.

The disclosure provides a method, wherein the first instant message comprises a presence response; and wherein the method further comprises the steps of: analyzing the presence response; and in response to determining that the user is not locatable at a first identified location, initiating a communication method for sending a presence request to a second identified location.

The disclosure provides a method, wherein the method further comprises the steps of storing the first instant message, in response to the user not being identified at a location on the list.

The disclosure provides a method, wherein the method further comprises the steps of initiating a communication method for sending the stored first instant message to a remote device associated with the user at an identified location, in response to the user being identified at a location on the list.

The disclosure provides a method, wherein the information source comprises social networking information.

The disclosure provides a method, wherein the information source further comprises hierarchical information.

Viewed from a third aspect the invention provides a computer program loadable into the internal memory of a digital computer, comprising software code portions for performing, when said program is run on a computer, to carry out the invention.

DETAILED DESCRIPTION

Figure 1:
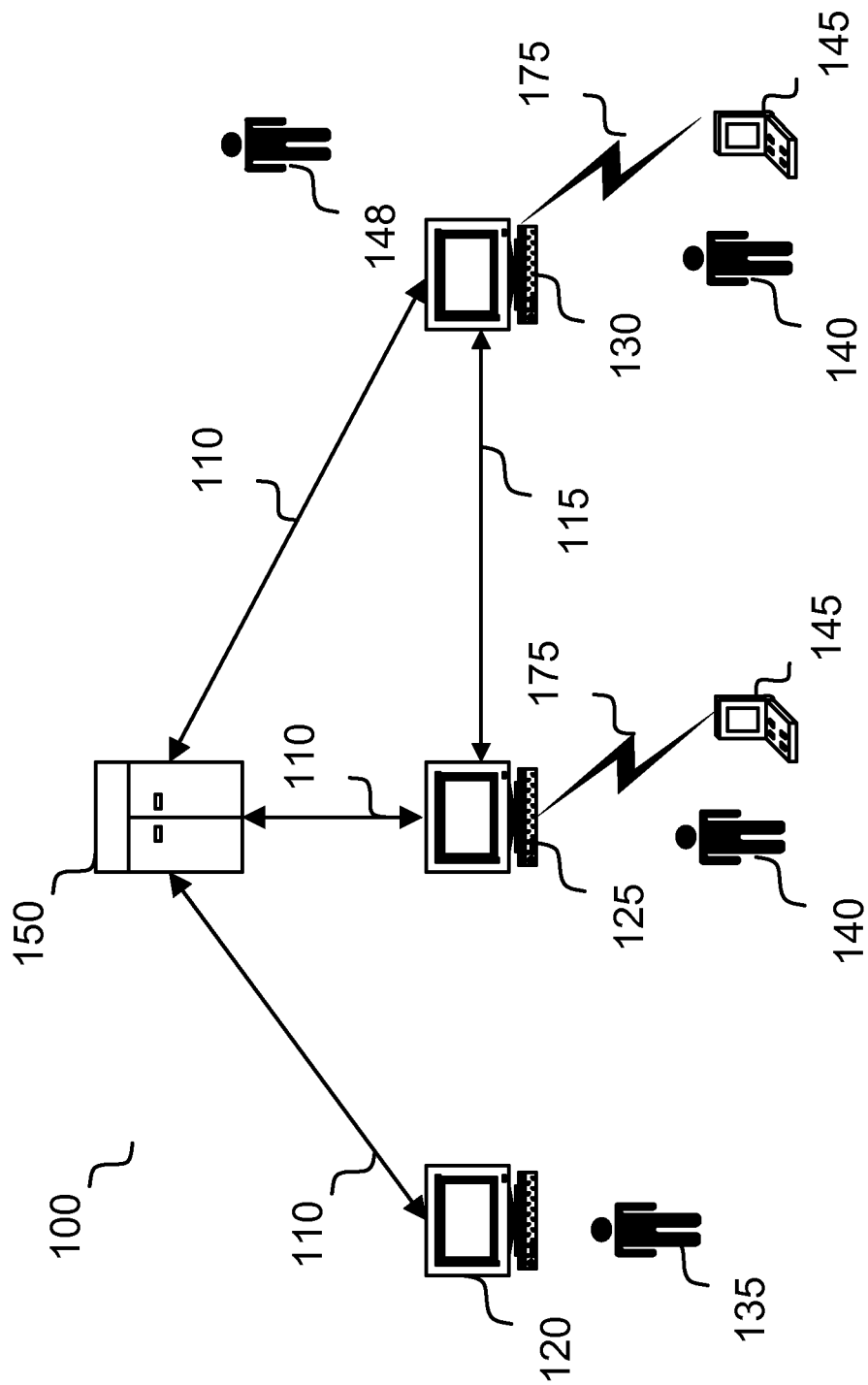
FIG. 1 is a block diagram depicting a data processing system in which the present invention may be embodied, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram depicting a data processing system 100 in which the present invention may be embodied. An IM system (not shown) is operable for use on a data processing system 100 that comprises workstation A 120, workstation B 125, workstation C 130, and a server 150. The workstations 120, 125, 130 and server 150 are connectable through a network 110. The workstations may also be connectable through peer to peer (P2P) connection 115. IM Clients (not shown) are operable for use on the workstations 120, 125, 130, in communication with an IM Server (also not shown) operable for use on the server 150, and with each other. FIG. 1 depicts User A 135, User B 140 and User C 148. User B 140 typically accesses the IM system through primary workstation B 125. User C 148 normally accesses the IM system through workstation C 130. At a later time, User B 140 is to be found nearer to workstation C 130. It is assumed that User B 140 also has constant access to a remote device 145, which is operable for communication with nearby workstation B 125, or workstation C 130 over short range wireless connection 175. However, the remote device 145 may not be within range of the workstation B 125 when User B 140 is in the vicinity of workstation C 130. For the avoidance of doubt, as used herein, User A 135 designates the sender of an instant message, and User B 140 designates the intended recipient of that instant message.

Figure 2:
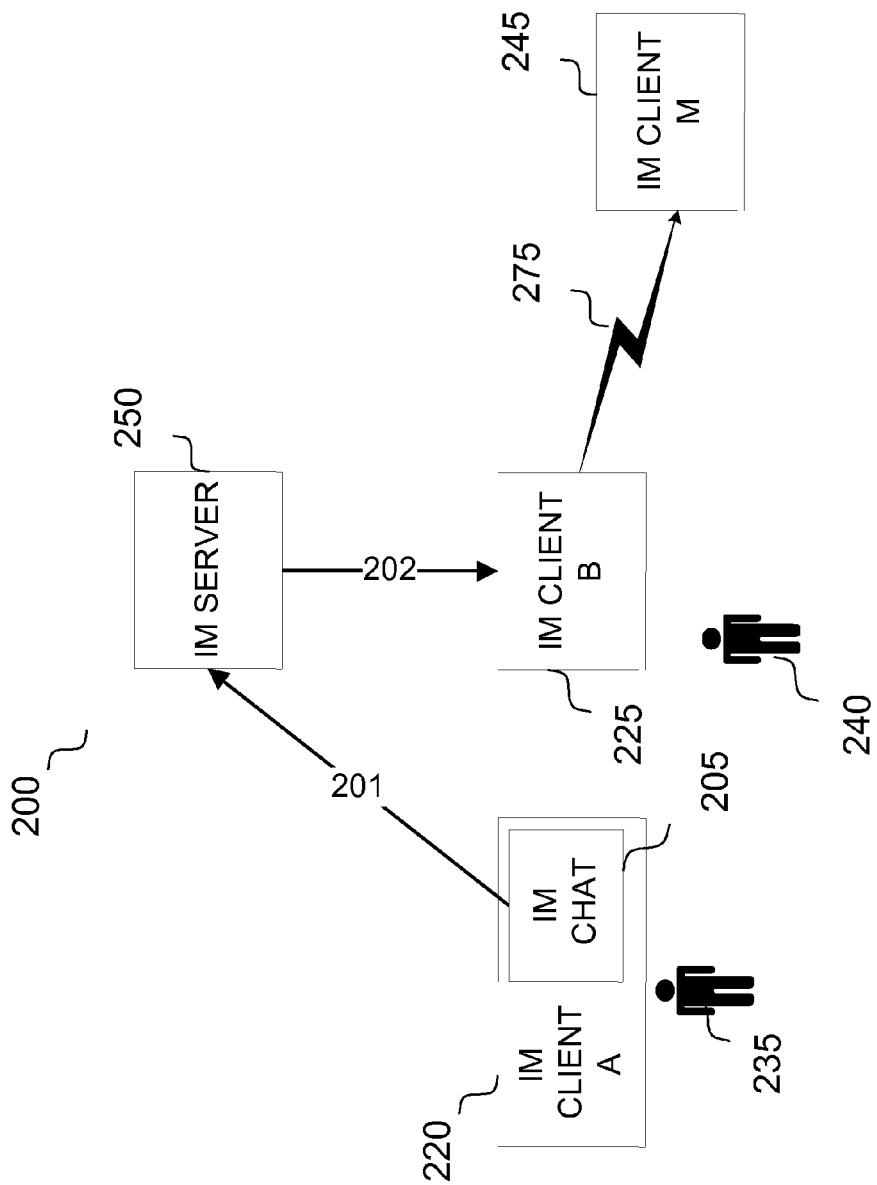
FIG. 2 is a block diagram depicting an IM system in which the present invention may be embodied, in accordance with an embodiment of the present invention.

FIG. 2, which should be read in conjunction with FIG. 1, is a block diagram depicting an IM system 200 in which the present invention may be embodied. IM Client A 220 is operable for use on workstation A 120. IM Client B 225 is operable for use on workstation B 125. IM Client M 245 is operable for use on a remote device 145. IM Client A 220 and IM Client B 225 are typically identical except for the workstation they are operable on. IM Client M 245 operable on remote device 145, typically, has less functionality than an IM Client operable on a workstation 120, 125, 130, because the remote device 145, typically, has less computing resources than a workstation 120, 125, 130. The disclosure is not limited in this regard and in various embodiments remote device 145 may have equivalent or greater computing resources than workstation 120, 125, 130 and still be within scope of this disclosure.

In particular, FIG. 2 depicts example paths taken by an IM chat message (IMC) 205 originating from User A 135, 235 and intended for User B 140, 240. Firstly, the IMC 205 is sent to the IM Server 250 operable with server 150 (not shown) on path 201. Secondly, the IMC 205 is sent to IM Client B 225 on path 202, where User B 240 may interact with the IMC 205. Responses from User B 240 to User A 235 follow the path in reverse. Alternatively, IM Client B 225 may forward the IMC 205 to IM Client M 245 through P2P wireless connection 275.

Figure 3:
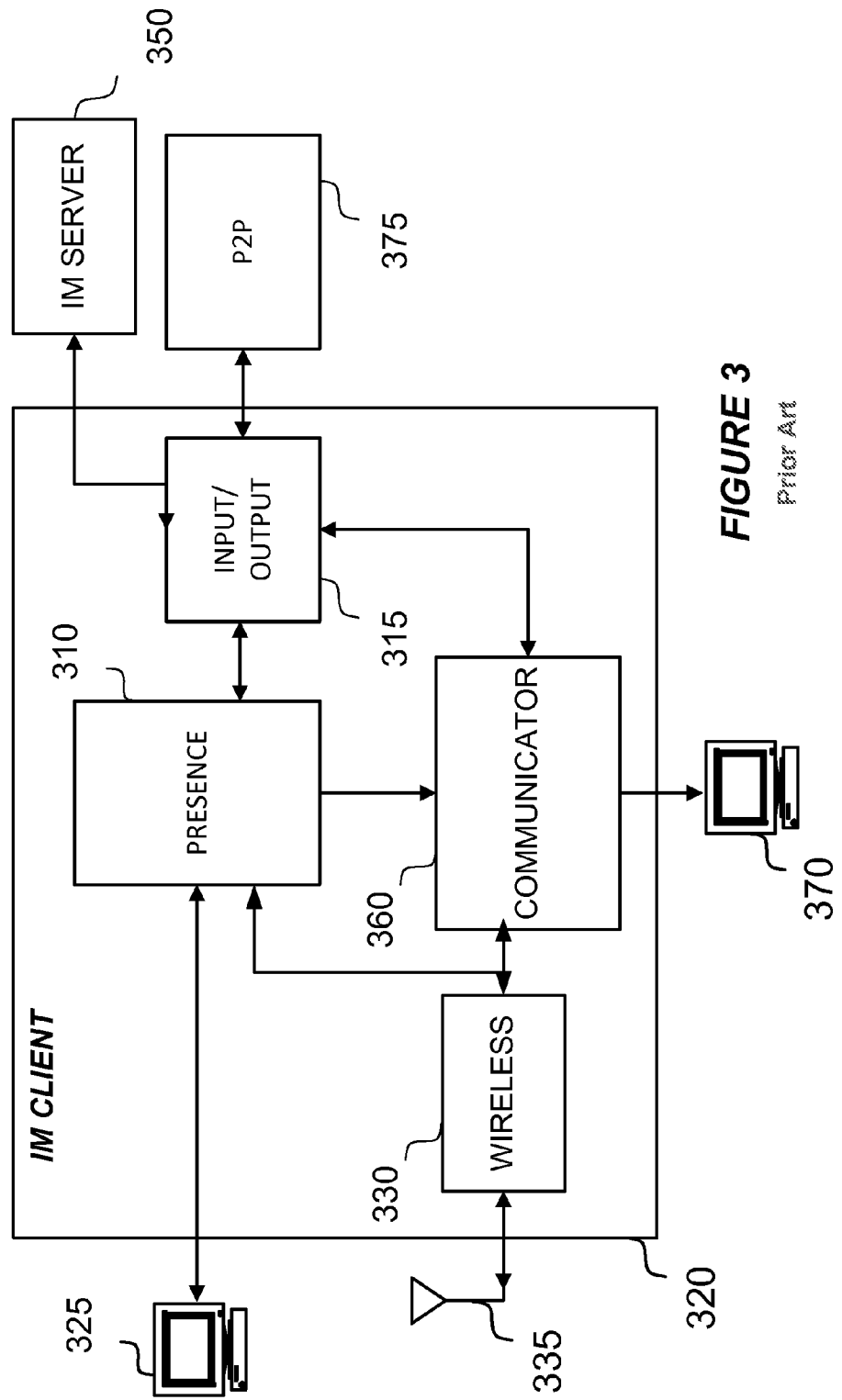
FIG. 3 is a block diagram depicting an IM Client.

FIG. 3 is a block diagram depicting an IM Client 320. The IM Client 320 comprises a plurality of software components operable for processing an incoming IMC 205 from IM Server 250, 350 or through P2P connections 275, 375 with another IM Client 320. Status responses may also be returned to the IM Server 250 or other IM Clients 320. Arrowed lines in this and subsequent block diagram figures depict exemplary connections between components. After being processed by the input/output component 315, a presence component 310 may determine whether User B 140, 240 is directly available using prior art techniques, for example by monitoring of interactions with components on the workstation 120, 125, 130. Alternatively, the presence component 310 may determine whether User B 140 is indirectly available by monitoring a wireless component 330 connectable to wireless circuitry 335 within the workstation 120, 125, 130. The wireless circuitry 335 monitors the presence of wireless devices within range, for example a remote device 145. Based on the presence status, a communicator component 360 may display the IMC 205 on the screen 370 of the workstation 120, 125, 130. Alternatively, if the remote device 145 of User B 140, 240 is available the communicator component may forward the IMC 205 through a P2P wireless connection through the wireless component 330 and wireless circuitry 335. Alternatively, the communicator component 360 may report to the originator of the IMC 205 that the IMC 205 may not be delivered as User B 140, 240 were not available at this location. Those skilled in the art will appreciate that such an apparatus can be implemented by a number of component variations, and that multiple components may be operable for one or multiple operations associated with the invention.

Figure 4:
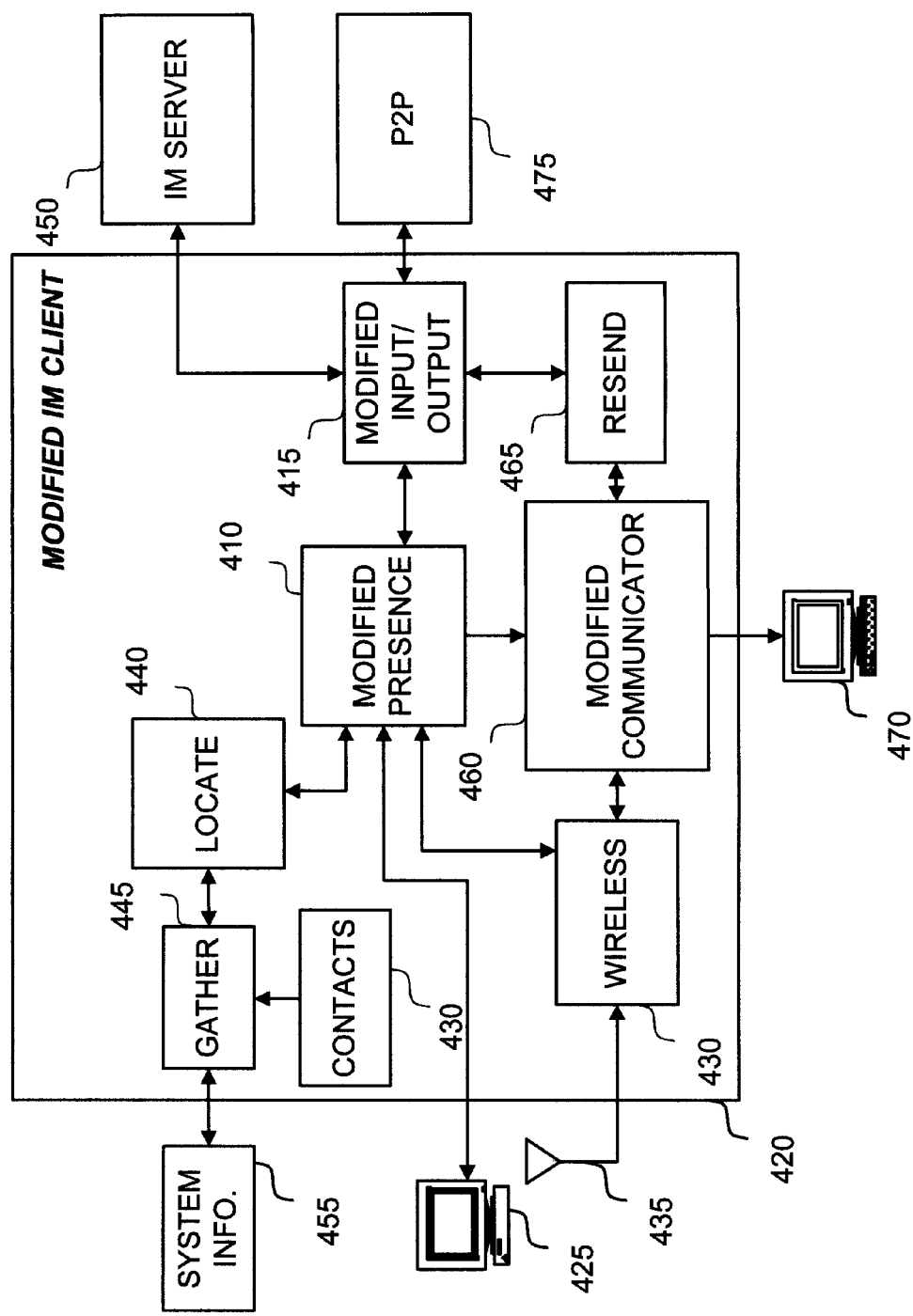
FIG. 4 is a block diagram depicting a modified IM Client in accordance with an embodiment of the present invention.

FIG. 4 is a block diagram depicting an exemplary modified IM Client 420 in accordance with an embodiment of the present invention. In one embodiment of the invention, if User B 140, 240 is not available at workstation B 125, a modified IM Client 420, operable for use on workstation B 125, may forward IMC 205 to a modified IM Client 420, operable for use on workstation C 130, near which User B 140 is located. The modified IM Client 420 associated with Workstation C 130 may forward the IMC 205 to the remote device 145 of User B 140. In a preferred embodiment of the invention a modified IM Client 420 may be operable for use on a remote device 145, such as a mobile device, or any other type of pervasive computer device. Alternatively, the IMC 205 may be converted into an alternative format that is operable for use on a remote device 145. The IM system 200 addresses the issue of IM availability by locating User B 140 when User B 140 is away from their primary workstation B 125, by creating a routing network based on social and hierarchical relationships between the sender User A 135 and receiver User B 140.

The exemplary modified IM Client 420 comprises a plurality of software components operable for processing a message from IM Server 250, 350, 450 or through P2P connections 375, 475 with other modified IM Clients 420. Alternative embodiments may comprise alternative software components. The message may comprise an IMC 205; a presence request; or a presence response. A presence request is a request from a first IM Client 420 to a second IM Client 420 for information concerning whether a user of the IM system 200 is available in the vicinity of the workstation that the second IM Client 420 is operable with. A presence response is a response to a presence request. Status responses may also be returned to the IM Server 450 or other modified IM Clients 420. After the message is evaluated by a modified input/output component 415, the modified presence component 410 may determine whether User B 140, 240 is directly available using prior art techniques as previously described. If User B 140, 240 is directly available, modified communicator component 460 may display the IMC 205 on the screen 370, 470 of the workstation 120, 125, 130. Alternatively, the modified presence component 410 may monitor a wireless component 430 connectable to a wireless circuitry 435 within the workstation 120, 125, 130 to determine whether User B 140, 240 is indirectly available. If User B 140, 240 is indirectly available, the modified communicator component 460 may forward the IMC 205 through a P2P connection through the wireless component 330, 430 and wireless circuitry 335, 435. Alternatively, the modified presence component 410 may evaluate a presence request from another workstation 120, 125, 130 for information concerning users of the IM system 200, or may evaluate a presence response from another workstation 120, 125, 130 for information concerning users of the IM system 200.

However, if User B 140, 240 is not available, a locate component 440 locates User B 140, 240. In a preferred embodiment of the invention, locate component 440 dynamically determines an ordered list of workstations 125, 130, 135 near which User B 140, 240 may be located. Ordering of the list determines in which order workstations will be requested to provide presence information about User B 140. Information concerning the list of workstations, may be gathered from a plurality of information sources by the gather component 445. The gather component 445 may use internal information or external information. An example of internal information may be a list of IM contacts stored in a contacts component 480. Another example is a list (not shown) of participants in recent IM conversations, as well as how recently such conversations took place. Examples of external information gathered from system information 455 gathered through the associated workstation 120, 125, 130, are, for example, hierarchical information from organization charts, social connections, and location awareness information of workstation C 130. Location awareness determines that, for example, no attempt is made to contact User B 140 through workstation C 130 located in a different geographic location than workstation B 125.

Modified communicator component 460 may request presence information from workstations C 130 identified on the ordered list. On locating User B 140 modified communicator component 460 may forward the IMC 205 through a resend component 465.

Figure 5:
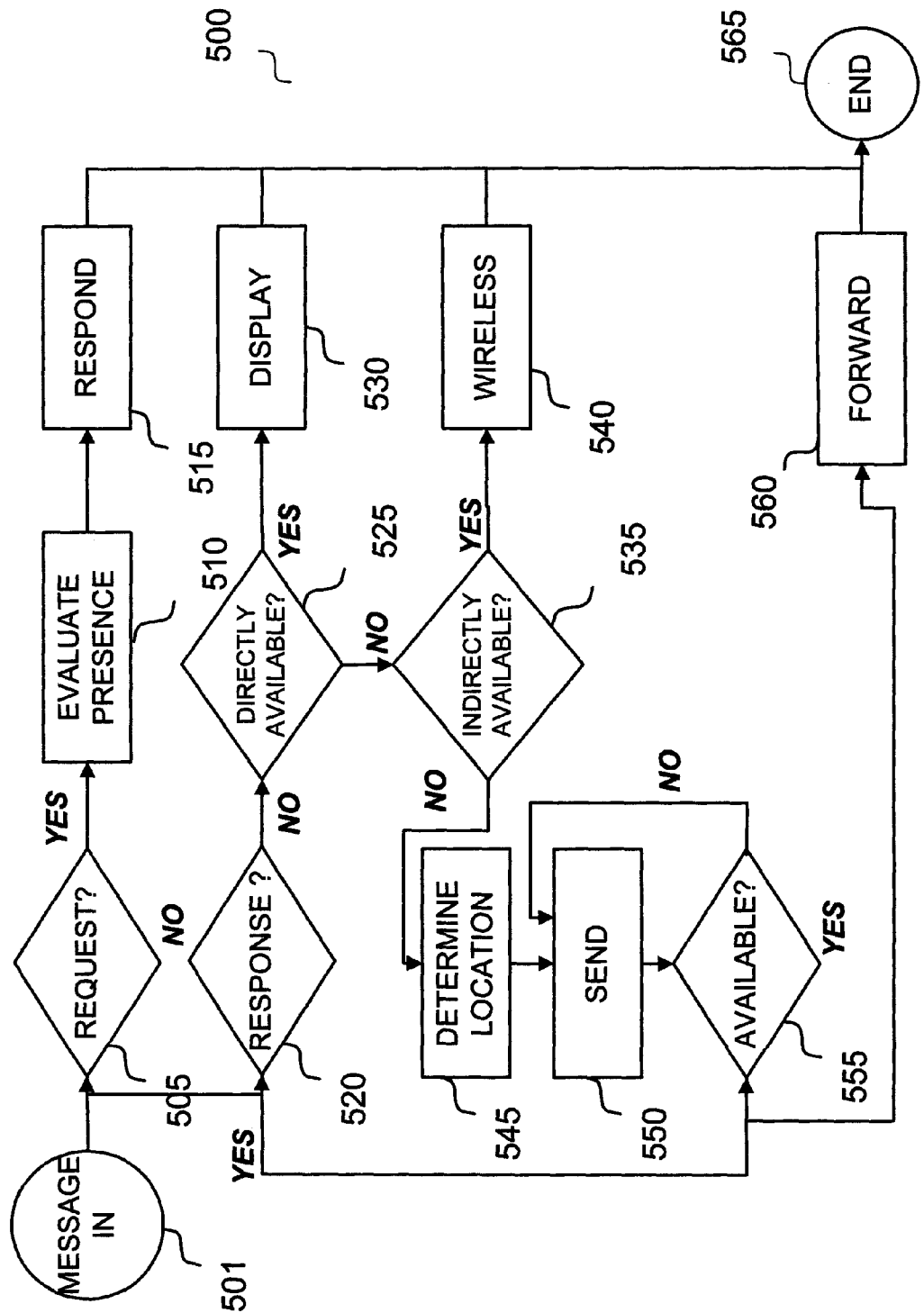
FIG. 5 is an exemplary schematic flow chart depicting typical operation steps performed by a modified IM Client to process a message in an embodiment of the invention.

FIG. 5 is an exemplary schematic flow chart 500 depicting typical operation steps performed by a modified IM Client 420 to process a message in an embodiment of the invention. FIG. 5 is set forth as a logical flow chart diagram. As such, the depicted order and labeled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

Following the receipt 501 of a message from an IM System, the message is evaluated at step 505 by a modified input/output component 415 to determine whether the message is a presence request. If the message is a presence request the presence of a specified user is determined at step 510 by the modified presence component 410. The resulting presence response may be positive or negative. At step 515, a modified communicator component 460 transmits the resulting presence response to the IM system 200.

At step 520, if the message is not a presence request, the message is evaluated by the modified input/output component 415 to determine whether the message is a presence response. If the message is a presence response it is evaluated further at step 555, described below.

If the message is not a presence response it may be an IMC 205 intended for User B 140. At step 525, the modified presence component 410 determines whether the User B 140 is directly available at workstation B 125. If User B 140 is directly available, at step 530, the modified communicator component 460 displays the IMC 205 on screen 470. If User B 140 is not directly available, at step 535, the modified presence component 410 determines whether User B is indirectly available. If User B 140 is indirectly available, at step 540, the modified communicator component 460 and the wireless component 430 establish a P2P communication path and pass the IMC 205 to the remote device 145.

At step 545, the locate component 440 determines location information, for example, an ordered list of possible locations where User B 140 might be. For example, a possible location might be workstation C 130. The ordered list is communicated to the modified presence component 410. At step 550, in a preferred embodiment, the modified communicator component 460 sends a presence request to a member of the ordered list. At step 555, the modified presence component 410 may evaluate whether the received presence response signifies whether User B 140 is directly or indirectly available at the requested ordered list member, for example, workstation C 130. If User B 140 is not available, at step 550, the modified communicator component 460 sends a further presence request to another chosen member of the ordered list. However, if User B 140 is available, at step 560, the modified communicator component 460 sends the IM 205 through the resend component 465 to workstation C 130. At step 565 the process completes. A presence response may comprise a plurality of parameters, for example, whether workstation C 130 allows further presence requests, or allows transmissions IMCs 205 to remote devices 145.

Figure 6:
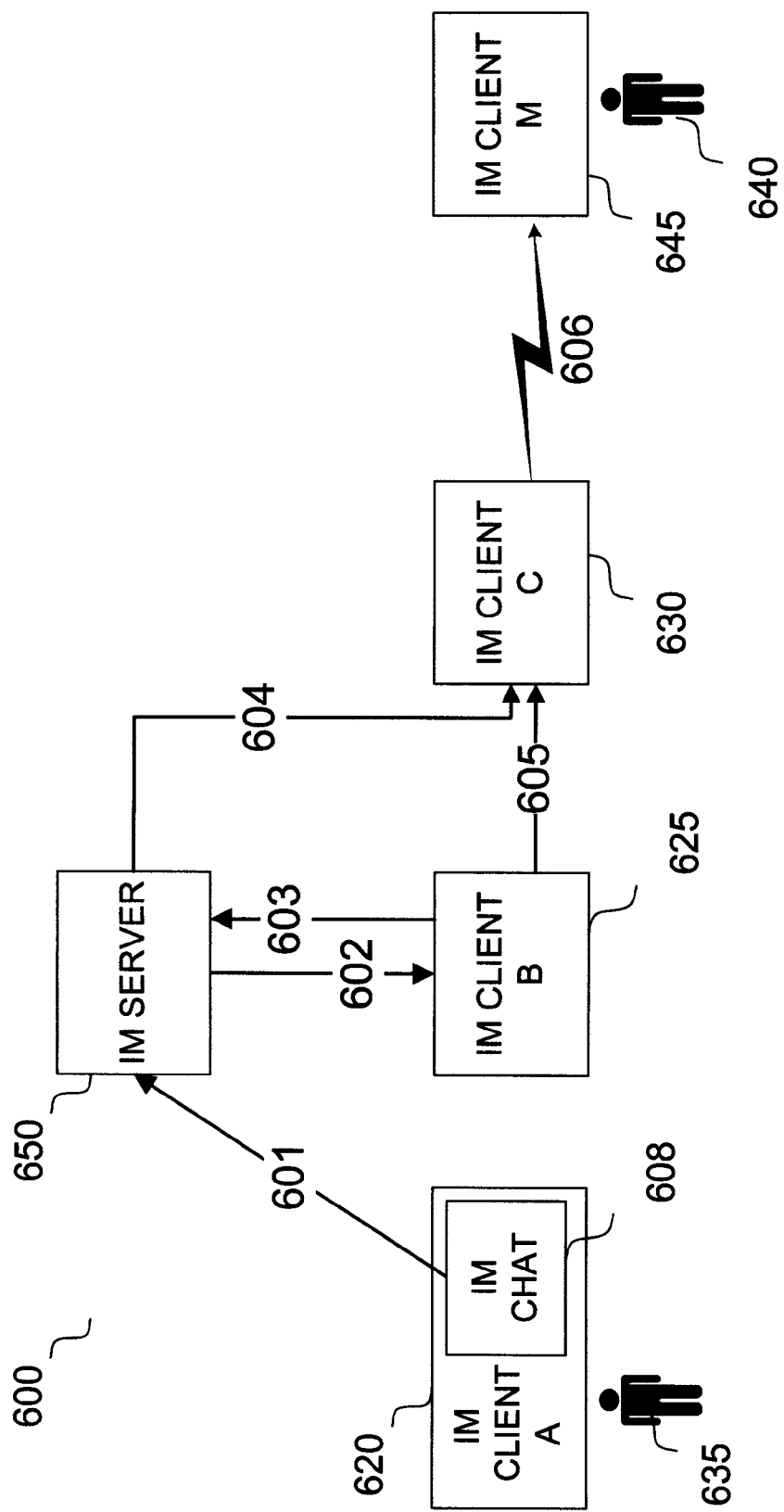
FIG. 6 is a block diagram depicting a modified IM system in accordance with an embodiment of the present invention.

FIG. 6 is a block diagram depicting a modified IM system 600 in accordance with an embodiment of the present invention. Modified IM Client A 420, 620 is operable for use on workstations A 120 (not shown); modified IM Client B 420, 625 is operable for use on workstation B 125 (not shown), and modified IM Client C 420, 625 is operable for use on workstation C 130 (not shown). An IM Client M 645 is operable for use on a remote device 145 (not shown). Also an IM Server 650 is operable for use on server 150 (not shown). Modified IM Client A 420, 620, modified IM Client B 420, 625, and modified IM Client C 420, 630 are typically identical except for the workstation they are operable for use on. Although User B 640 is logged on to modified IM Client B 420, 625, User B 640 is not available at workstation B 125. However, User B 640 is indirectly available to workstation C 130. FIG. 6 also depicts network connection paths 601, 602, 603, 604, 605, and 606 between the components of the modified IM system 600. In a preferred embodiment of the invention, in a Client/Server model of operation, an IMC 205, 608 is sent to User B 640 using example paths 601, 602, 603, 604, and 606. In an alternative embodiment of the invention with a P2P connection an IMC 205, 608 is sent to User B 640 using example paths 601, 602, 605, and 606.

Figure 7:
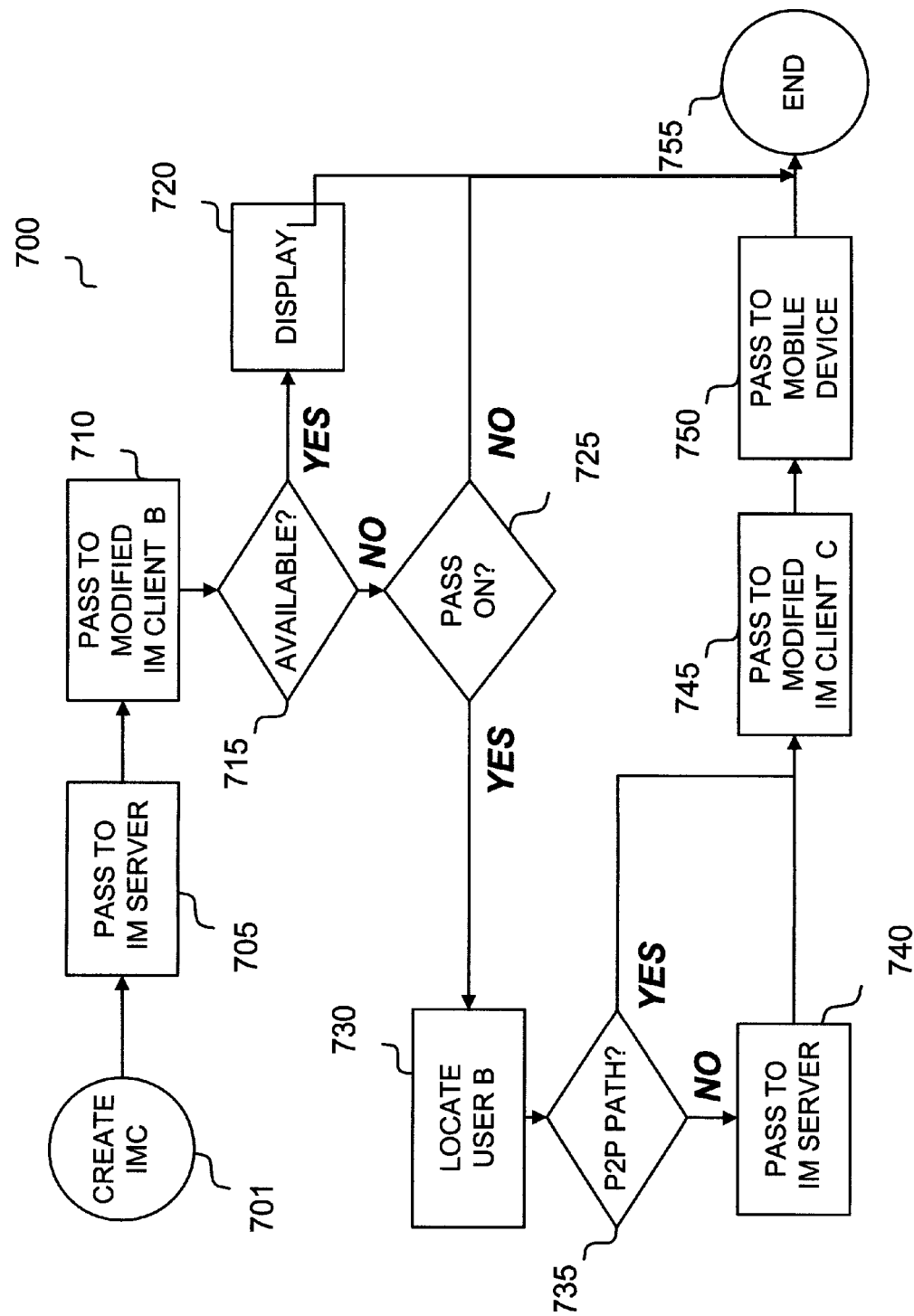
FIG. 7 is an exemplary schematic flow chart depicting typical operation steps performed by a modified IM system to process a message in an embodiment of the invention.

FIG. 7 is an exemplary schematic flow chart 700 depicting typical operation steps performable by a modified IM system 600 for processing a message in an embodiment of the invention. At step 701 an IMC 608 is created in modified IM Client A 420, 620. At step 705 the IMC 608 is passed to an IM Server 650. At step 710 the IM Server 650 passes the IMC 608 to the modified IM Client B 420, 625. At step 715 the modified IM Client B 420, 630 determines whether User B 640 is directly or indirectly available. At step 720 in response to the availability of User B 640, the modified IM Client B 420, 625 either displays the IMC 608 on a screen 370 of workstation B 125 or transmits the IMC 608 to a remote device 145. At step 725, in response to User B 640 not being available, in a preferred embodiment, the IMC 608 is analyzed by the modified IM Client B 420, 625, using prior art techniques, to determine whether the IMC 608 may be passed on. If the IMC 608 may be passed on to another location, at step 730, the modified IM Client B 420, 625 creates an ordered list of workstations 125, 130, 135 near which User B 640 may be located. The modified IM Client B 420, 625 polls the members of the ordered list in turn until User B 640 is located. At step 735, the modified IM Client B 420, 625 determines whether a P2P network link 605 exists between workstation B 125 and a workstation C 130 near which User 640 is located. If such a link 605 does exist, at step 745 the modified IM Client B 420, 625 passes the IMC 608 to modified IM Client C 420, 630. If no P2P network link 605 exists, at step 740 the modified IM Client B 420, 625 passes the IMC 608 to the IM Server 650. At step 745 the IMC 608 is passed to modified IM Client C 420, 630. At step 750, modified IM Client C 420, 630 creates a one time connection and passes the IMC 608 to a remote device 145 available to User B 640. At step 755 the flow chart completes.

In an alternative embodiment, modified IM Client C 420, 630 opts not to pass the IMC 608 to the remote device 145. Modified IM Client C 420, 630 composes a further IMC (not shown). Modified IM Client C 420, 630 sends the further IMC to the remote device 145 with information that User A 635 is attempting to contact User B 640. This communication system uses a one off transmit to the remote device, so the remote device is not trusted or paired with the computer except at the point of a message being sent or received.

In an alternative embodiment, User C 148 opts not to allow transmission of IMC 608, for example, if User C 148 is using the short-range wireless network 606. In response IMC 608 is routed by modified IM Client B 420, 630 to a next trusted workstation. Modified IM Client C 420, 635 may transmit an access flag to modified IM Client B 420, 630 to record that future connections to modified IM Client C 420, 635 are not permitted.

In one embodiment, the modified IM System permits IMCs 608 to be transmitted in both directions. Mobile device 145 transmits IMCs 608 through permitted workstations C 420, 630 to a destination. A workstation C 420, 630 is permitted to accept an IMC 608 from a remote device 145 if the workstation C 420, 630 is a member of an ordered list in modified IM Client B 420, 625.

In one embodiment, a modified IM Client 420 may be configured to choose the route that is most "convenient", for example a route that passes the most number of criteria. For example, a workstation C 130 that is paired through a wireless protocol with workstation B 125, and whose user User C 148 is in the same trusted social network as the User B 140, 240, 640, may be chosen over workstations whose users are not in the same trusted social network.

In an alternative embodiment, if User B 140 moves out of range of both Bluetooth and wireless networks (for example, if they leave the building altogether), the IMCs 608 sent may be cached in a modified IM Client B 420, 625 until the remote device 145 of User B 140 requests a network connection again.

It should be appreciated that the flow of the figures shows an IM client centric approach, where client-side software has been modified to forward IM communications to a different IM client, when a desired user is unavailable. Substantially equivalent results can be achieved by modifying an IM server (in a server dependent embodiment, as opposed to a peer-to-peer embodiment). That is, the IM server can determine when a user is not available at a primary work station, can determine a location of the user (via a presence server or similar technique), and can forward or reroute the communication to that user. In one embodiment, a user can explicitly establish a forward address (e.g., an IP address) with the server when away from their primary workstation, which facilitates the forwarding process at the server.

Additionally, a hybrid approach can be implemented, where server-side forwards occur when possible (when supported by an IM server), and otherwise functionality can be implemented by an IM client (when the IM server does not support forwarding, or when a peer-to-peer configuration is used and no IM server is present, for example). Thus, the functionality of the disclosure can be implemented in either a client, a server, or both—which permits maximum compatibility with legacy systems. Further, the functionality can be implemented by a proxy or network node, which is able to intercept IM messages. For example, the IM forwarding functionality can be implemented as a Web service in one contemplated embodiment without requiring appreciable modifications of client-side (IM client) or server-side (IM server) code.

For the avoidance of doubt, the term "comprising", as used herein throughout the description and claims is not to be construed as meaning "consisting only of". It will be appreciated by those skilled in the art that the invention is not just limited to email messages, but is also applicable to other types of messages that have a distribution list that can be updated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An instant messaging client apparatus operable for use with a data
    processing system associated with a data processing network, the apparatus comprising:
    an input/output component comprising hardware and software stored in a non-transitory storage medium that when executed by a processor receives from the data processing network a first instant message;
    a presence component comprising hardware and software stored in a non-transitory storage medium that when executed by the processor determines whether a user is locatable at the instant messaging client in order for the user to transmit a response to the received first instant message;
    a first location component comprising hardware and software stored in a non-transitory storage medium that when executed by the processor analyzes an information source associated with the user for determining a list of locations where the user is locatable for communication, in response to determining that the user is not locatable at the instant messaging client, wherein the list of locations at which the user is available is not set by the user as the locations for receiving the instant message, wherein the information source comprises at least social networking information and hierarchical information;
    a second location component comprising hardware and software stored in a non-transitory storage medium that when executed by the processor polls the list of locations to determine whether the user is present at a location identified on the list by
        determining for a first one of the locations of the list whether the user is directly available for IM communications;
        if the determining of direct availability is TRUE, conveying the received first instant message to a computer indicated as being directly available to the user;
        if the determining of direct availability is FALSE, determining for the first one of the locations whether the user is indirectly availability for IM communications;
        if the determining of indirect availability is TRUE, conveying the received first instant message to a computer indicated as being indirectly availability, wherein this computer establishes a peer-to-peer wireless communication with a remote device and conveys the first instant message over this peer-to-peer wireless communication to the remote device for use by the user; and
        if the determining of indirect availability is false, proceeding to a next location of the list and repeating until availability is true or until the list of location is exhausted; and
    a communicator component comprising hardware and software stored in a non-transitory storage medium that when executed by the processor initiates a communication method for sending the received first instant message to a remote device associated with the user at the identified location, in response to the user being identified at a location on the list.

2. The apparatus as claimed in claim 1, wherein the presence component further comprises comprising hardware and software stored in a non-transitory storage medium that when executed by the processor wirelessly monitors a remote device connectable to the instant messaging client.

3. The apparatus as claimed in claim 2, wherein the communicator component comprising hardware and software stored in a non-transitory storage medium that when executed by the processor initiates a wireless communication method for sending the received first instant message to the remote device, in response to the user being identified at the remote device.

4. The apparatus as claimed in claim 3, wherein the communicator component comprising hardware and software stored in a non-transitory storage medium that when executed by the processor sends a second instant message to the remote device associated with the user at the instant messaging client, in response to the apparatus determining not to send the first instant message to the remote device, wherein the second instant message indicates that the first instant message has been received.

5. The apparatus as claimed in claim 1, wherein the apparatus comprising hardware and software stored in a non-transitory storage medium that when executed by the processor communicates with an instant messaging server through the data processing network.

6. The apparatus as claimed in claim 1, wherein the apparatus comprising hardware and software stored in a non-transitory storage medium that when executed by the processor communicates with a further instant messaging client through a peer to peer connection.

7. The apparatus as claimed in claim 1, wherein the first instant message comprises a chat message.

8. The apparatus as claimed in claim 1, wherein the communicator component comprising hardware and software stored in a non-transitory storage medium that when executed by the processor initiates communication method for sending a presence response to a messaging client, in dependence on the first instant message comprises a presence request.

9. The apparatus as claimed in claim 1, wherein:
    the first instant message comprises a presence response;
    the presence component comprising hardware and software stored in a non-transitory storage medium that when executed by the processor analyses the presence response; and
    the communicator component comprising hardware and software stored in a non-transitory storage medium that when executed by the processor in response to determining that the user is not locatable at a first identified location, initiates a communication method for sending a presence request to a second identified location.

10. The apparatus as claimed in claim 1, wherein the communicator component comprising hardware and software stored in a non-transitory storage medium that when executed by the processor stores the first instant message, in response to the user not being identified at a location on the list.

11. The apparatus of claim 10, wherein the communicator component comprising hardware and software stored in a non-transitory storage medium that when executed by the processor initiates a communication method for sending the stored first instant message to a remote device associated with the user at an identified location, in response to the user being identified at a location on the list.

12. The apparatus as claimed in claim 1, wherein the instant messaging client comprises a computing device and software loaded and executable upon the computing device, wherein the instant messaging application is one of the software components loaded and executable upon the computing device.

13. A method for processing an instant message operable for use with a data processing system associated with a data processing network, the method comprising:
at least one computing device receiving from the data processing network a first instant message to a user from at least one participant in an IM session involving the user;
at least one computing device determining whether the user is locatable at an instant messaging client in order for the user to transmit a response to the received first instant message;
at least one computing device analyzing an information source associated with the user for determining a list of locations where the user is locatable for communication, in response to determining that the user is not locatable at the instant messaging client, wherein the list of locations at which the user is available is not set by the user as the locations for receiving the instant message, wherein the information source comprises at least social networking information and hierarchical information;
at least one computing device polling the list of locations to determine whether the user is present at a location identified on the list by:
determining for a first one of the locations of the list whether the user is directly available for IM communications;
if the determining of direct availability is TRUE, conveying the received first instant message to a computer indicated as being directly available to the user;
if the determining of direct availability is FALSE, determining for the first one of the locations whether the user is indirectly availability for IM communications;
if the determining of indirect availability is TRUE, conveying the received first instant message to a computer indicated as being indirectly availability, wherein this computer establishes a peer-to-peer wireless communication with a remote device and conveys the first instant message over this peer-to-peer wireless communication to the remote device for use by the user; and
if the determining of indirect availability is false, proceeding to a next location of the list and repeating until availability is true or until the list of location is exhausted; and
at least one computing device initiating a communication for sending the received first instant message to a remote device associated with the user at the identified location, in response to the user being identified at a location on the list, wherein to the at least one participant, the user appears to be online for the IM session as normal even though the IM message has been sent to the remote device associated with the user.

14. The method as claimed in claim 13, wherein the method further comprises sending the received first instant message to the remote device, in response to the user being identified at the remote device.

15. The method as claimed in claim 14, wherein the method further comprises initiating a wireless communication method operable for sending a second instant message to the remote device associated with the user at the instant messaging client, in response to the apparatus determining not to send the first instant message to the remote device, wherein the second instant message indicates that the first instant message has been received.

16. The method as claimed in claim 13, wherein the method further comprises communicating with an instant messaging server through the data processing network.

17. The method as claimed in claim 13, wherein the method further comprises communicating with a further instant messaging client through a peer to peer connection.

18. The method as claimed in claim 13, wherein the first instant message comprises a chat message.

19. The method as claimed in claim 13, wherein the method further comprises initiating a communication method for sending a presence response to a messaging client, in dependence that the first instant message comprises a presence request.

20. The method as claimed in claim 13, wherein the first instant message comprises a presence response; and
wherein the method further comprises:
analysing the presence response; and
in response to determining that the user is not locatable at a first identified location, initiating a communication method for sending a presence request to a second identified location.

21. The method of claim 13, wherein the method further comprises storing the first instant message, in response to the user not being identified at a location on the list.

22. The method of claim 20, wherein the method further comprises initiating a communication method for sending the stored first instant message to a remote device associated with the user at an identified location, in response to the user being identified at a location on the list.

23. A computer program product comprising a non-transitory storage medium having computer usable program code embodied therewith, the computer usable program code comprising:
computer usable program code stored on a non-transitory storage medium that when executed by a processor is operable to receive from a data processing network a first instant message;
computer usable program code stored on a non-transitory storage medium that when executed by a processor is operable to determine whether a user is locatable at an instant messaging client in order for the user to transmit a response to the received first instant message;
computer usable program code stored on a non-transitory storage medium that when executed by a processor is operable to analyse an information source associated with the user for determining a list of locations where the user is locatable for communication, in response to determining that the user is not locatable at the instant messaging client, wherein the list of locations at which the user is available is not set by the user as the locations for receiving the instant message, wherein the information source comprises at least social networking information and hierarchical information;
computer usable program code stored on a non-transitory storage medium that when executed by a processor is operable to poll the list of locations to determine whether the user is present at a location identified on the list by:
determining for a first one of the locations of the list whether the user is directly available for IM communications;
if the determining of direct availability is TRUE, conveying the received first instant message to a computer indicated as being directly available to the user;

if the determining of direct availability is FALSE, determining for the first one of the locations whether the user is indirectly availability for IM communications;

if the determining of indirect availability is TRUE, conveying the received first instant message to a computer indicated as being indirectly availability, wherein this computer establishes a peer-to-peer wireless communication with a remote device and conveys the first instant message over this peer-to-peer wireless communication to the remote device for use by the user; and if the determining of indirect availability is false, proceeding to a next location of the list and repeating until availability is true or until the list of location is exhausted; and computer usable program code stored on a non-transitory storage medium that when executed by a processor is operable to initiate a communication for sending the received first instant message to a remote device associated with the user at the identified location, in response to the user being identified at a location on the list, wherein said computer program product when executed ensures that the user does not miss instant messaging communications because he/she physically moved locations, wherein to other participants of an instant messaging communication other than the user, the user appears to be online as normal for instant messaging communication.

24. A computing device comprising:

a processor;

a non-transitory computer medium;

a network transceiver;

a bus communicatively linking said processor, said non-transitory computer medium, and said network transceiver to each other;

and at least one computer program product stored on the non-transitory computer medium and comprising machine usable instructions capable of being executed to the processor causing the system to:

receive from a data processing network a first instant message;

determine whether a user is locatable at an instant messaging client in order for the user to transmit a response to the received first instant message;

analyse an information source associated with the user for determining a list of locations where the user is locatable for communication, in response to determining that the user is not locatable at the instant messaging client;

poll the list of locations to determine whether the user is present at a location identified on the list, which includes determining direct availability and indirect availability of the user at the location, wherein direct availability means that the user interacts with an IM client to which the first message is sent, wherein indirect availability means that the user interacts with an IM client through a short range remote device within wireless communication range of the IM client that receives the first instant message and thereafter wirelessly conveys the first instant message to the short range remote device by:

determining for a first one of the locations of the list whether the user is directly available for IM communications;

if the determining of direct availability is TRUE, conveying the received first instant message to a computer indicated as being directly available to the user;

if the determining of direct availability is FALSE, determining for the first one of the locations whether the user is indirectly availability for IM communications;

if the determining of indirect availability is TRUE, conveying the received first instant message to a computer indicated as being indirectly availability, wherein this computer establishes a peer-to-peer wireless communication with a remote device and conveys the first instant message over this peer-to-peer wireless communication to the remote device for use by the user; and if the determining of indirect availability is false, proceeding to a next location of the list and repeating until availability is true or until the list of location is exhausted;

initiate a communication for sending the received first instant message to a remote device associated with the user at the identified location, in response to the user being identified at a location on the list; and send a second instant message to the remote device associated with the user at the instant messaging client, in response to the apparatus determining not to send the first instant messaging to the remote device, wherein the second instant message indicates that the first instant message has been received.

* * * * *